(12) United States Patent
Bruflodt et al.

(10) Patent No.: US 11,661,722 B2
(45) Date of Patent: May 30, 2023

(54) SYSTEM AND METHOD FOR CUSTOMIZED VISUALIZATION OF THE SURROUNDINGS OF SELF-PROPELLED WORK VEHICLES

(71) Applicant: Deere & Company, Moline, IL (US)

(72) Inventors: Rachel Bruflodt, Dubuque, IA (US);
Michael G. Kean, Maquoketa, IA (US);
Keith J. Lensing, Asbury, IA (US);
Giovanni A. Wuisan, Epworth, IA (US)

(73) Assignee: Deere & Company, Moline, IL (US)

(*) Notice: Subject to any disclaimer, the term of this patent is extended or adjusted under 35 U.S.C. 154(b) by 82 days.

(21) Appl. No.: 16/952,631

(22) Filed: Nov. 19, 2020

(65) Prior Publication Data
US 2022/0154423 A1 May 19, 2022

(51) Int. Cl.
*E02F 9/20* (2006.01)
*E02F 9/26* (2006.01)
*G05D 1/02* (2020.01)

(52) U.S. Cl.
CPC .............. *E02F 9/205* (2013.01); *E02F 9/265* (2013.01); *G05D 1/0238* (2013.01); *G05D 1/0246* (2013.01); *G05D 2201/0202* (2013.01)

(58) Field of Classification Search
CPC ........ E02F 9/205; E02F 9/265; G05D 1/0238; G05D 1/0246; G05D 2201/0202
See application file for complete search history.

(56) References Cited

U.S. PATENT DOCUMENTS

| 7,671,725 | B2 | 3/2010 | Tsuji et al. |
| 8,830,265 | B2* | 9/2014 | Nielsen ............... G09G 5/00 345/629 |

(Continued)

FOREIGN PATENT DOCUMENTS

| DE | 10317044 A1 | 10/2004 |
| DE | 102011014368 A1 | 9/2012 |

(Continued)

OTHER PUBLICATIONS

German Search Report issued in application No. DE102021211375.3 dated May 27, 2022 (12 pages).

*Primary Examiner* — Peter D Nolan
*Assistant Examiner* — Demetra R Smith-Stewart
(74) *Attorney, Agent, or Firm* — Gary L. Montle; Lucian Wayne Beavers; Patterson Intellectual Property Law, PC (57) ABSTRACT

A self-propelled work vehicle is provided with a control system enabling the use of gestures on a touch screen interface to provide a simple and intuitive way to manipulate displayed images, and/or automatically changing a region of interest of a surround view camera unit. Exemplary automatic manipulation may be implemented if a work vehicle is detected as performing a certain function, wherein surround view images can automatically change to a smaller sub-view which gives more focused visibility appropriate to that function. The distortion and simulated field of view of surround view images may also/otherwise be automatically manipulated based on a detected operation/function. The control system can also/otherwise dynamically modify surround view images in accordance with a detected work state, and/or based on outputs from an obstacle detection system. The control system can also/otherwise lock the sub-view to recognized objects of interest, such as trucks or trenches.

20 Claims, 4 Drawing Sheets

(56) References Cited

U.S. PATENT DOCUMENTS

| | | |
|---|---|---|
| 8,954,252 B1 | 2/2015 | Urmson et al. |
| 9,332,229 B2 * | 5/2016 | Ishimoto ................ G06V 20/58 |
| 9,712,791 B2 | 7/2017 | Kim et al. |
| 9,908,385 B2 | 3/2018 | Chundrlik, Jr. et al. |
| 10,479,354 B2 | 11/2019 | Posselius et al. |
| 2010/0289899 A1 | 11/2010 | Hendron et al. |
| 2014/0085466 A1 | 3/2014 | Moriyama et al. |
| 2014/0152778 A1 | 6/2014 | Ihlenburg et al. |
| 2014/0188333 A1 | 7/2014 | Friend |
| 2014/0278065 A1 | 9/2014 | Ren |
| 2014/0354816 A1 | 12/2014 | Inanobe et al. |
| 2014/0362220 A1 * | 12/2014 | Izumikawa ............. G01S 17/89 348/148 |
| 2014/0375814 A1 | 12/2014 | Ishimoto et al. |
| 2015/0199847 A1 | 7/2015 | Johnson et al. |
| 2016/0200252 A1 * | 7/2016 | Oota ...................... B60T 17/18 348/148 |
| 2017/0050566 A1 | 2/2017 | Yamashita et al. |
| 2017/0131722 A1 | 5/2017 | Hiramatsu et al. |
| 2017/0135277 A1 | 5/2017 | Hiramatsu et al. |
| 2018/0035050 A1 | 2/2018 | Lu et al. |
| 2018/0234626 A1 | 8/2018 | Ali et al. |
| 2018/0245316 A1 | 8/2018 | Forcash et al. |
| 2019/0048559 A1 | 2/2019 | Olsen et al. |
| 2019/0059199 A1 | 2/2019 | Stanhope |
| 2020/0150848 A1 | 5/2020 | Deng |
| 2020/0340208 A1 * | 10/2020 | Kitajima ................. B66C 13/18 |
| 2020/0354001 A1 * | 11/2020 | Hayashi ............. B62D 49/0614 |
| 2021/0298220 A1 * | 9/2021 | Kean ..................... A01B 69/004 |
| 2022/0078961 A1 * | 3/2022 | Kraus ....................... G06T 7/70 |

FOREIGN PATENT DOCUMENTS

| | | |
|---|---|---|
| DE | 102014013155 A1 | 3/2015 |
| DE | 102019119008 A1 | 1/2020 |
| DE | 102019131942 A1 | 5/2020 |
| EP | 1303140 A1 | 4/2003 |
| EP | 2234399 A1 | 9/2010 |
| EP | 2309453 A2 | 4/2011 |
| EP | 2511137 A1 | 10/2012 |
| EP | 2937811 A1 | 10/2015 |
| EP | 3272586 A1 | 1/2018 |
| JP | 2008248613 A | 10/2008 |

* cited by examiner

SYSTEM AND METHOD FOR CUSTOMIZED VISUALIZATION OF THE SURROUNDINGS OF SELF-PROPELLED WORK VEHICLES

FIELD OF THE DISCLOSURE

The present disclosure relates generally to self-propelled work vehicles such as construction and forestry machines, and more particularly to systems and methods for customized visualization of the surroundings for such self-propelled work vehicles.

BACKGROUND

Self-propelled work vehicles as discussed herein may for example include excavator machines, loaders, forestry machines, and other equipment which modify the terrain or equivalent working environment in some way. These work vehicles may have tracked or wheeled ground engaging units supporting the undercarriage from the ground surface, and may further include one or more working implements which are used to modify the terrain in coordination with movement of the work vehicle.

There is an ongoing need in the field of such work vehicles for solutions that provide better operational awareness for the operator. One problem for the operator is that the surroundings of the work vehicle can only be directly observed to a limited extent from the operator cab. There is an added difficulty in the case of, e.g., front loader and rear loader work machines, wherein the operator's view may be substantially limited to the front or rear depending on the orientation and position of the work implement(s). Consequently, the operator may be unable to sufficiently identify external objects from a typical working position that are concealed by the work implement in his field of vision. Of particular importance may be objects that are to the rear of the operator's field of vision and within the pivoting range of the machine frame and/or work implement.

Some conventional systems involve cameras which record an image of a rearward region of the work vehicle, which is displayed on a display unit arranged in the operator cab. Other known systems include cameras mounted to provide a "bird's eye" view of the machine when their respective images are stitched together. These systems can help an operator to see what is around the vehicle, but they require individual selection of a given image, and are limited in scope to the particular images captured by cameras at predetermined locations on the work vehicle.

This can be problematic for contexts in which it is desirable for an operator to view smaller sections of the full surround (i.e., 360-degree) view, or to manipulate the shape and size of the image. For example, more detailed or less distorted individual images may be highly desirable when performing certain machine functions, or when obstacles are detected by an obstacle detection system

BRIEF SUMMARY

The current disclosure provides an enhancement to conventional systems, at least in part by introducing a novel system and method for enabling the use of gestures on a touch screen interface to provide a simple and intuitive way to manipulate displayed images, and/or automatically changing a region of interest of a surround view camera unit based on e.g. identified work conditions.

In the context of manual manipulation as noted above, certain embodiments of a control system as disclosed herein may be provided such that a set of natural touch gestures are used to manipulate the image produced by a surround view camera unit, including but not limited to: a 'pinch' movement to change the size and distortion of the surround view image; the tapping of zones on the full 360-degree surround view to enter smaller sub-views corresponding to the locations of the 'taps': and/or the sliding of a finger (or equivalent instrument at a point of engagement) left and right to pivot the sub-view image around the machine.

In the context of automatic manipulation as noted above, certain embodiments of a control system as disclosed herein may further or in the alternative be provided such that if a work vehicle is detected as performing a certain function, the surround view image can automatically change to a smaller sub-view which gives more focused visibility appropriate to that function. Some illustrative but non-limiting examples may include: wherein the work vehicle is backing up straight, and the surround view changes to a sub-view of the rear of the work vehicle; wherein on an excavator the boom and bucket controls are engaged in a digging or trenching pattern, and the surround view changes to a sub-view of the front of the machine, which focuses on the boom and bucket; and/or on an excavator, when the machine is commanded to swing, the surround view changes to a sub-view showing the area into which the counterweight is swinging.

In addition to changing the region of interest, the distortion and simulated field of view of the surround view image can also in certain embodiments be automatically manipulated based on the detected function. Some illustrative but non-limiting examples may include: when the machine travels faster, the simulated field of view becomes larger; the simulated field of view automatically adjusting based on the instantaneous movement or function of an attachment or implement, such as increasing the field of view when an excavator boom reaches out farther; and/or the surround view image dynamically changing to account for the identification of a specific attachment being coupled to or otherwise equipped to the work vehicle. Further illustrative but non-limiting examples of this latter case may include: when a forks attachment is equipped to a loader, the surround view changes to a sub-view with a simulated field of view and distortion so as to optimize a view of the tips of the forks; and/or when a cold planer is mounted on a skid steer loader, the surround view changes to a sub-view of the rear of the work vehicle in expectation of travel in reverse.

The control system can in certain embodiments also dynamically modify the surround view image in accordance with a detected work state or work vehicle cycle. Some illustrative but non-limiting examples may include: if it is detected that an excavator is operating in a particular work state such as a twelve-second cycle of 180-degree truck loading, then the surround view system may anticipate when the operator is about to swing the work vehicle and preemptively bring up a sub-view of the area into which the operator will swing.

The control system can in certain embodiments also dynamically change the region of interest in a surround view system based on outputs from an obstacle detection system. For example, if an obstacle is detected, the surround view image may automatically change to a sub-view which focuses on the area where the object was detected. If the obstacle detection system outputs the height of the object, the surround view system can automatically manipulate the distortion and simulated field of view of the image to give the detected object a less distorted appearance in the image.

The control system can in certain embodiments also selectively and dynamically switch, and even lock upon, the sub-view of a surround view image to a recognized or specified object of interest, such as a truck or trench or specific individual. For example, the controller may be programmatically arranged to identify objects of interest based on image recognition algorithms and specified conditions, or even based on specified inputs from an RFID device located within the surroundings of the work vehicle.

In one particular and exemplary embodiment, a method is provided herein for displaying surroundings of a self-propelled work vehicle comprising a main frame. One or more images are received corresponding to surroundings of the work vehicle, said images recorded via a corresponding one or more cameras supported by the main frame. The recorded images are processed to map the images to a shape corresponding to a first defined display radius and a first defined display depth. Responsive to at least one trigger action, one or more display images are generated on a display unit corresponding to at least one selected region of interest in the surroundings of the work vehicle.

In one exemplary aspect according to the above-referenced embodiment, the one or more generated display images may include both of, or selectively switch between, an overhead downward facing display image and an outward facing display image.

In another exemplary aspect of the above-referenced embodiment, the generated display image may comprise an overhead downward facing display image corresponding to the first defined display radius and the first defined display depth, the method comprising being responsive to a trigger action of at least a first type to generate an overhead downward facing display image corresponding to a second defined display radius and a second defined display depth.

In another exemplary aspect further in accordance with the above-referenced embodiment and exemplary aspects, the trigger action of at least the first type may comprise one or more automatically determined operating conditions.

In another exemplary aspect further in accordance with the above-referenced embodiment and exemplary aspects, the trigger action of at least the first type may comprise a detected change in speed of the self-propelled work vehicle, wherein the overhead display image is reconfigured to increase the second defined display radius and the second defined display depth in association with an increase in the speed of the self-propelled work vehicle, and the overhead display image is reconfigured to decrease the second defined display radius and the second defined display depth in association with a decrease in the speed of the self-propelled work vehicle.

In another exemplary aspect further in accordance with the above-referenced embodiment and exemplary aspects, the at least one trigger action may comprise a selective manual engagement of the overhead display image via a user interface.

In another exemplary aspect further in accordance with the above-referenced embodiment and exemplary aspects, responsive to a trigger action of at least a second type, the method may further include manipulating the selected region of interest for the generated outward facing display image.

For example, the trigger action of at least the second type may comprise a detected change in configuration of the self-propelled work vehicle.

The self-propelled work vehicle may comprise a work implement coupled to the main frame, wherein the detected change in configuration of the self-propelled work vehicle comprises a detected change in configuration of the work implement.

The work implement may be controllably moveable with respect to the main frame, wherein the trigger action of at least the second type comprises a detected movement of the work implement and/or a predicted movement of the work implement.

The movement of the work implement may be predicted based on a determined work cycle of the self-propelled work vehicle.

As another or alternative example, the trigger action of at least the second type may comprise a detected obstacle in the surroundings of the work vehicle.

In another exemplary aspect further in accordance with the above-referenced embodiment and exemplary aspects, the method may be further responsive to a trigger action of at least a third type to laterally pivot the outward-facing display image.

In another exemplary aspect further in accordance with the above-referenced embodiment and exemplary aspects, the outward-facing display image may be generated in place of the overhead display image responsive to the trigger action of at least the second type; and/or the outward-facing display image and the overhead display image are independently displayed on the same display unit, and independently modified responsive to different types of trigger actions.

In another embodiment, a self-propelled work vehicle as disclosed herein may be provided with a main frame, one or more cameras supported by the main frame and configured to record images of corresponding surroundings of the work vehicle, at least one work implement coupled to the main frame and configured for working terrain surrounding the work vehicle, and a controller communicatively linked to the one or more cameras and the display unit. The controller may further be configured to direct the performance of method steps according to the above-referenced embodiments and any of the associated exemplary aspects.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-8C, various embodiments may now be described of a system and method for customized visualization of the surroundings of a self-propelled work vehicle.

Figure 1:
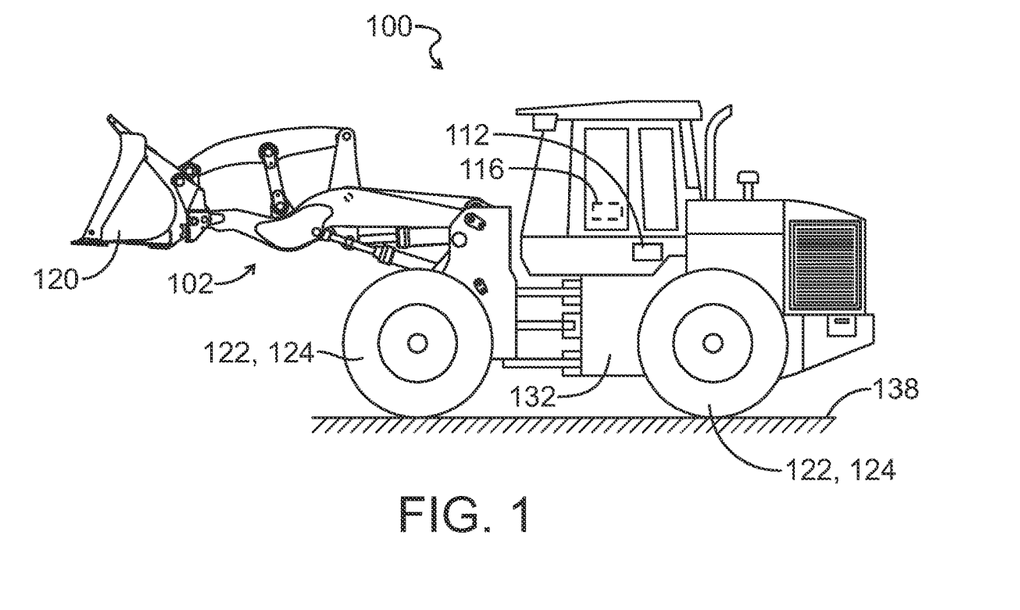
FIG. 1 is a side view of an exemplary self-propelled work vehicle comprising an embodiment of a control system and method as disclosed herein.

FIG. 1 in a particular embodiment as disclosed herein shows a representative self-propelled work vehicle 100 in the form of, for example, a loader having a front-mounted working implement 120 for modifying the proximate terrain. It is within the scope of the present disclosure that the work vehicle 100 may be in the form of any other self-propelled vehicle using an attachment implement to modify the proximate terrain, particularly a work vehicle designed for use in off-highway environments such as a construction or forestry vehicle, for example.

The illustrated work vehicle 100 includes a main frame 132 supported by a left-side tracked ground engaging unit 122 and a right-side tracked ground engaging unit 124, and at least one travel motor (not shown) for driving the respective ground engaging units. Each of the tracked ground engaging units 122, 124 may typically include a front idler, a drive sprocket, and a track chain extending around the front idler and the drive sprocket. The travel motor of each tracked ground engaging unit 122, 124 drives its respective drive sprocket. Each tracked ground engaging unit 122, 124 has a forward traveling direction defined from the drive sprocket toward the front idler. The forward traveling direction of the tracked ground engaging units 122, 124 also defines a forward traveling direction of the undercarriage and thus of the self-propelled work vehicle 100.

The working implement 120 for the illustrated self-propelled work vehicle 100 comprises a front-mounted loader bucket 120 coupled to a boom assembly 102. The loader bucket 120 faces generally away from the operator of the loader 100, and is moveably coupled to the main frame 132 via the boom assembly 102 for forward-scooping, carrying, and dumping dirt and other materials. In an alternative embodiment wherein the self-propelled work vehicle is for example a tracked excavator, the boom assembly 102 may be defined as including at least a boom and an arm pivotally connected to the boom 144. The boom in the present example is pivotally attached to the main frame 132 to pivot about a generally horizontal axis relative to the main frame 132. A coupling mechanism may be provided at the end of the boom assembly 102 and configured for coupling to the working implement 120, which may also be characterized as a working tool, and in various embodiments the boom assembly 102 may be configured for engaging and securing various types and/or sizes of attachment implements 120.

In other embodiments, depending for example on the type of self-propelled work vehicle 100, the working implement 120 may be a sweep cleaner, hay bale fork, hay bale hugger, grapple, scraper, pallet fork, debris blower, blade, snow pusher, or the like for performing a specific task.

An operator's cab may be located on the main frame 132. The operator's cab and the boom assembly 102 (or the working implement 120 directly, depending on the type of work vehicle 100) may both be mounted on the main frame 132 so that the operator's cab faces in the working direction of the working implements 120. A control station including a user interface 116 may be located in the operator's cab.

A user interface 116 as described herein may be provided as part of a display unit configured to graphically display indicia, data, and other information, and in some embodiments may further provide other outputs from the system such as indicator lights, audible alerts, and the like. The user interface may further or alternatively include various controls or user inputs (e.g., a steering wheel, joysticks, levers, buttons) 208 for operating the work vehicle 100, including operation of the engine, hydraulic cylinders, and the like. Such an onboard user interface may be coupled to a vehicle control system via for example a CAN bus arrangement or other equivalent forms of electrical and/or electro-mechanical signal transmission. Another form of user interface (not shown) may take the form of a display unit that is generated on a remote (i.e., not onboard) computing device, which may display outputs such as status indications and/or otherwise enable user interaction such as the providing of inputs to the system. In the context of a remote user interface, data transmission between for example the vehicle control system and the user interface may take the form of a wireless communications system and associated components as are conventionally known in the art.

Figure 3:
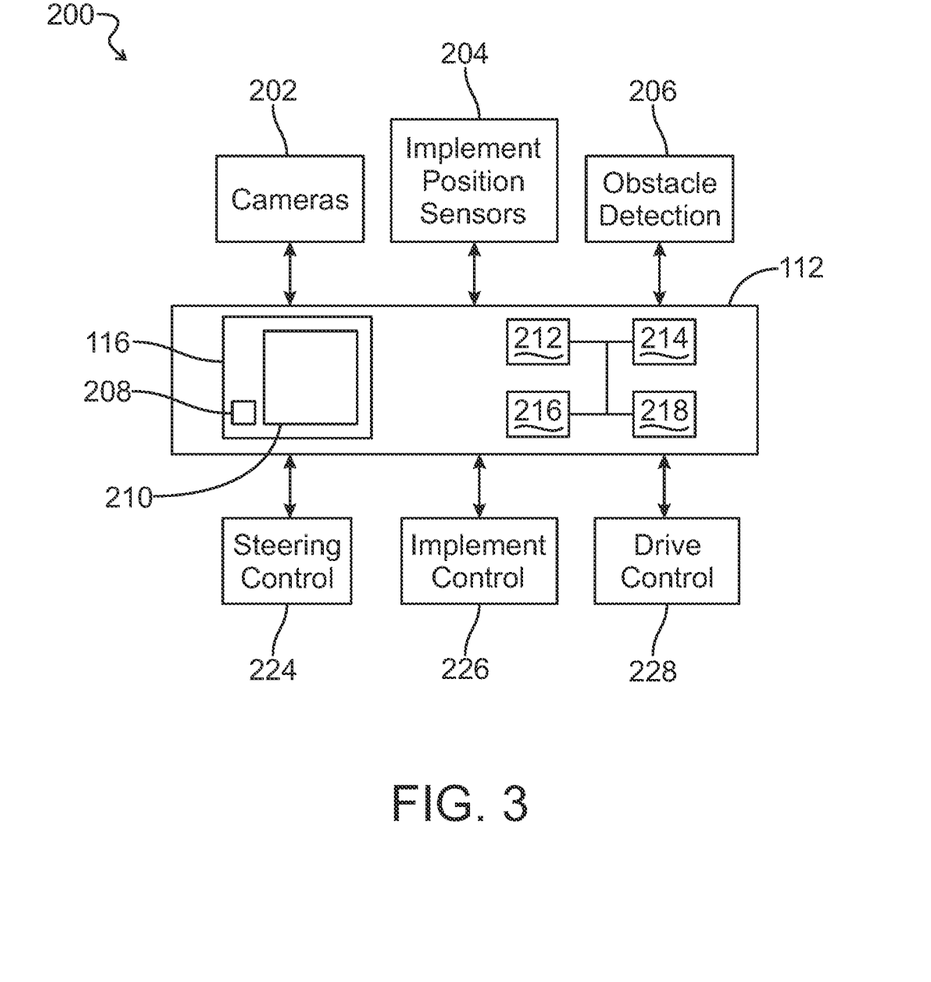
FIG. 3 is a block diagram representing an exemplary embodiment of a control system as disclosed herein.

As schematically illustrated in FIG. 3, the work vehicle 100 includes a control system 200 including a controller 112. The controller 112 may be part of the machine control system of the work vehicle, or it may be a separate control module. The controller 112 may include the user interface 116 and optionally be mounted in the operators cab at a control panel.

The controller 112 is configured to receive inputs from some or all of various sources such as a camera system 202, an implement position detection system 204, and an obstacle detection system 206.

Figure 2:
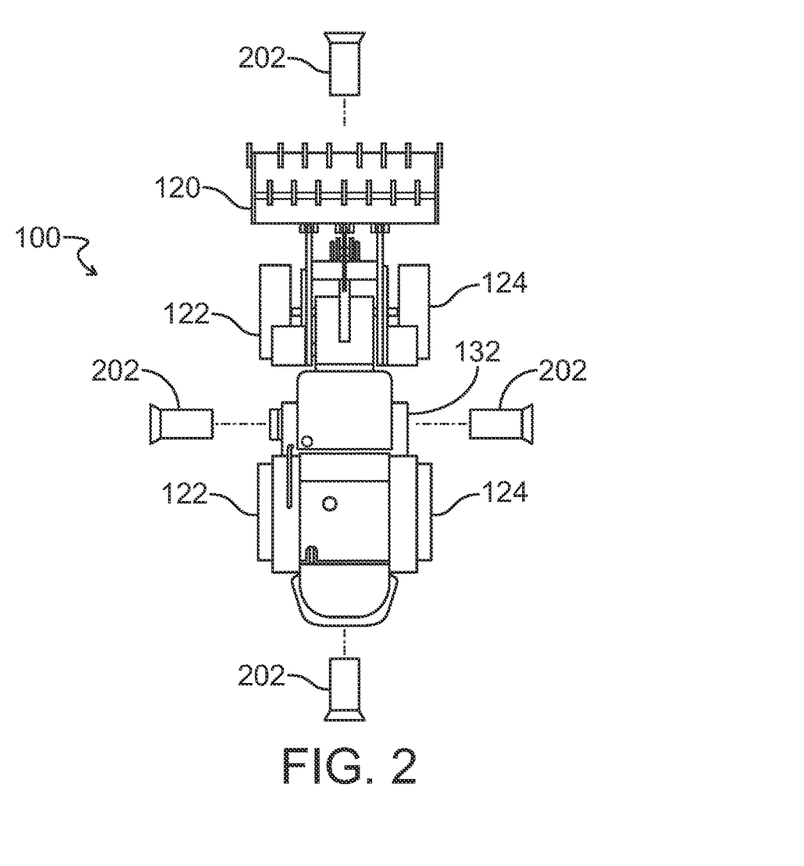
FIG. 2 is an overhead view of the self-propelled work vehicle of FIG. 1, with multiple cameras associated therewith and represented in an exploded perspective view.

Referring to FIG. 2, the camera system 202 may comprise one or more imaging devices such as cameras 202 mounted on the self-propelled work vehicle 100 and arranged to capture images corresponding to surroundings of the self-propelled work vehicle 100. In an embodiment as illustrated, four cameras 202 are arranged at each of front, left, rear, and right sides from the perspective of a working direction of the work vehicle 100, for recording individual image regions of the surroundings of the work vehicle 100 from different image recording positions. However, such a number and orientation of said cameras is merely exemplary, and is non-limiting on the scope of the present disclosure unless otherwise specifically noted herein. The cameras 202 in each case may record a specific image region of the ground surface 138, or alternatively may be controlled to different positions associated with other image regions. The position and size of an image region recorded by a respective camera 202 may depend on the arrangement and orientation of the camera and the camera lens system, in particular the focal length of the lens of the camera.

An exemplary implement position detection system 204 may include inertial measurement units (IMUs) mounted to respective components of the working implement 120 and/or boom assembly 102 and/or main frame 132, sensors coupled to piston-cylinder units to detect the relative hydraulically actuated extensions thereof, or any known alternatives as may be known to those of skill in the art.

In various embodiments, additional sensors may be provided to detect machine operating conditions or positioning, including for example an orientation sensor, global positioning system (GPS) sensors, vehicle speed sensors, vehicle implement positioning sensors, and the like, and whereas one or more of these sensors may be discrete in nature the sensor system may further refer to signals provided from the machine control system.

Other sensors may collectively define an obstacle detection system 206, various examples of which may include ultrasonic sensors, laser scanners, radar wave transmitters and receivers, thermal sensors, imaging devices, structured light sensors, other optical sensors, and the like. The types and combinations of sensors for obstacle detection may vary for a type of work vehicle, work area, and/or application, but generally may be provided and configured to optimize recognition of objects proximate to, or otherwise in association with, a determined working area of the vehicle.

The controller 112 may typically coordinate with the above-referenced user interface 116 for the display of various indicia to the human operator. The controller may further generate control signals for controlling the operation of respective actuators, or signals for indirect control via intermediate control units, associated with a machine steering control system 224, a machine implement control system 226, and/or a machine drive control system 228.

The controller 112 includes or may be associated with a processor 212, a computer readable medium 214, a communication unit 216, data storage 218 such as for example a database network, and the aforementioned user interface 116 or control panel having a display 210. An input/output device 208, such as a keyboard, joystick or other user interface tool, is provided so that the human operator may input instructions to the controller 112. It is understood that the controller 112 described herein may be a single controller having all of the described functionality, or it may include multiple controllers wherein the described functionality is distributed among the multiple controllers.

Various operations, steps or algorithms as described in connection with the controller 112 can be embodied directly in hardware, in a computer program product such as a software module executed by the processor 212, or in a combination of the two. The computer program product can reside in RAM memory, flash memory, ROM memory, EPROM memory, EEPROM memory, registers, hard disk, a removable disk, or any other form of computer-readable medium 214 known in the art. An exemplary computer-readable medium 214 can be coupled to the processor 212 such that the processor 212 can read information from, and write information to, the memory/storage medium 214. In the alternative, the medium 214 can be integral to the processor 212. The processor 212 and the medium 214 can reside in an application specific integrated circuit (ASIC). The ASIC can reside in a user terminal. In the alternative, the processor 212 and the medium 214 can reside as discrete components in a user terminal.

The term "processor" 212 as used herein may refer to at least general-purpose or specific-purpose processing devices and/or logic as may be understood by one of skill in the art, including but not limited to a microprocessor, a microcontroller, a state machine, and the like. A processor 212 can also be implemented as a combination of computing devices, e.g., a combination of a DSP and a microprocessor, a plurality of microprocessors, one or more microprocessors in conjunction with a DSP core, or any other such configuration.

The communication unit 216 may support or provide communications between the controller 112 and external systems or devices, and/or support or provide communication interface with respect to internal components of the self-propelled work vehicle 100. The communications unit may include wireless communication system components (e.g., via cellular modem, WiFi, Bluetooth or the like) and/or may include one or more wired communications terminals such as universal serial bus ports.

The data storage 218 as discussed herein may, unless otherwise stated, generally encompass hardware such as volatile or non-volatile storage devices, drives, memory, or other storage media, as well as one or more databases residing thereon.

Referring generally to FIGS. 4-8C, exemplary modes of operation may further be described with respect to the aforementioned work vehicle.

Figure 4:
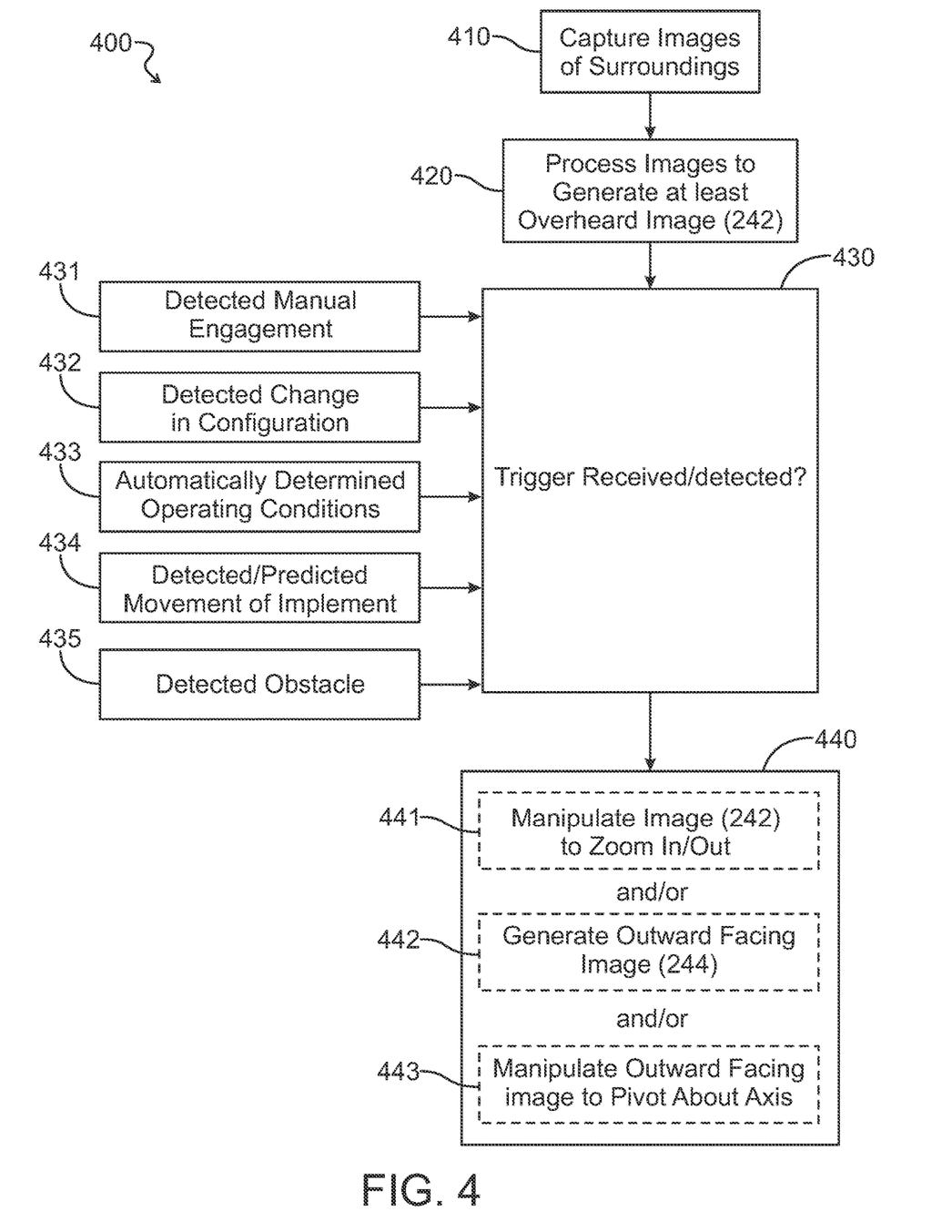
FIG. 4 is a flowchart representing an exemplary embodiment of a method as disclosed herein.

Referring further now to FIG. 4, an embodiment of a method 400 for customized visualization of the surroundings of a self-propelled work vehicle 100 may now be described.

The illustrated method 400 begins with a step 410 of capturing images of the surroundings of the self-propelled work vehicle 100. As previously noted, the images may be provided from a single camera 202, or a plurality of imaging devices 202 disposed in various locations about the work vehicle 100.

In step 420, the method 400 continues by processing the captured images to generate at least a first image (e.g., an overhead image) with respect to the surroundings, which may typically include the self-propelled work vehicle 100 itself.

Figure 5:
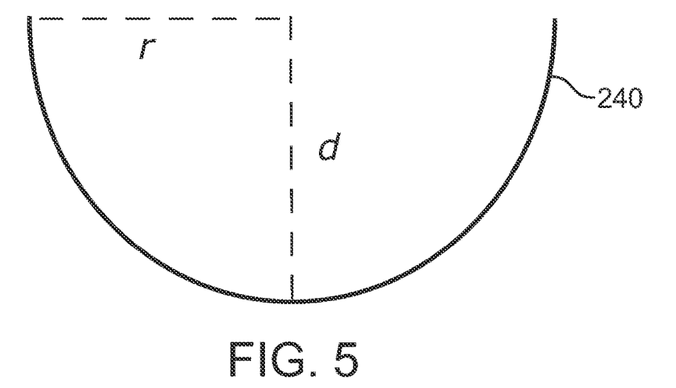
FIG. 5 is a graphical diagram representing a simplified surround view image mapping shape as disclosed herein.
Figure 6:
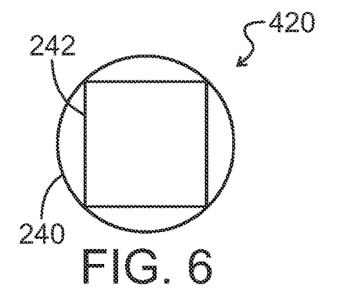
FIG. 6 is a graphical diagram representing a rectangular 360-degree surround view in the form of a rectangular cutout from a top-down view of a mapped surround view image as disclosed herein.

Referring to FIGS. 5 and 6, an exemplary surround view image as disclosed herein may be created by mapping the separate camera images to, e.g., a circular "bowl" shape 240, and blending them together. The 360-degree surround view image 242 is a top down view of the mapped "bowl," formatted into a shape (e.g., rectangular, square) appropriate for the display 210. The depth d and radius r of the bowl affect the simulated field of view of the surround view image 242 and the distortion of objects in the image. The center of the bottom of the bowl 240 may be correlated to the center of the self-propelled work vehicle 100. Where multiple images may overlap on the bowl 240, they may be blended together by for example combining the corresponding pixel values of the respective cameras 202 using conventional alpha-blending techniques.

In step 430, the method 400 continues by monitoring for any of one or more possible trigger actions, the detection of which cause the generation (step 440) of a second and modified image on the display 210. Various exemplary types of trigger actions (431-435), and corresponding actions responsive thereto (441-443), are described next, but are not intended as limiting unless otherwise specifically noted herein. Various alternative examples of trigger actions and/or corresponding actions responsive thereto may be considered within the scope of the present disclosure.

In various embodiments, the trigger action detected in step 430 may take the form of a manual engagement trigger 431 with respect to the display 210 or equivalent user interface tool.

For example, a detected "pinching" action may result in changes to both the depth d and radius r of the bowl 240. A first direction of the pinching action (e.g., first and second initial points of engagement being directed towards each other) may result in an increased depth d and radius r of the bowl 240 corresponding to a "zoom out" feature, and a second direction of the pinching action (e.g., first and second initial points of engagement being directed away from each other) may result in a decreased depth d and radius r of the bowl 240 corresponding to a "zoom in" feature. In each case, the control system 200 responds to the detected trigger action 431 by manipulating the first image on the display 210 to a second image on the display 210 in a zoomed in/out orientation (step 441) corresponding to, e.g., the revised depth d and radius r of the bowl 240, themselves further possibly corresponding to a magnitude of the pinching action.

In addition, or in alternative embodiments, a trigger action detected in step 430 may be a detected "tapping" action with respect to one of a plurality of zones as smaller portions of the circular bowl 240 (e.g., in the rear, either side, front, or even corners of the work vehicle), wherein a zone-specific square/rectangular sub-view 244 is generated from an outward-facing (i.e., lateral) perspective view. The zone corresponding to the tap action may be one of a plurality of predetermined zone locations about the circumference of the circular bowl 240. In various embodiments, zones may alternatively be dynamically defined with the point of the tap defining a center of the zone and the perimeter of the sub-view 244 correspondingly generated about the user-defined center, such that the number of zones is limited only by the number of potential tap points with respect to the bowl 240. In the sub-view mode 244, only a portion of the full 360-degree surround view image is shown, and this portion is scaled up to give the operator a more focused view of that particular area.

In an embodiment, a subsequently detected tapping gesture anywhere on the sub-view 244 may prompt the control system to exit the sub-view mode 244 and return to an overhead surround view 242. However, in other embodiments the overhead surround view 242 and a selected sub-view 244 may be displayed together at the same time, or a selected sub-view 244 may be generated alongside a correspondingly reduced overhead surround view 242, and then removed in favor of a corresponding enlarged overhead surround view 242 upon subsequent detection of a tapping gesture anywhere on the sub-view 242 or the overhead surround view 244, etc.

Figure 7A:
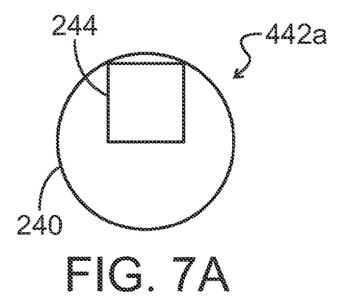
FIGS. 7A-7B are graphical diagrams representing lateral viewing zones corresponding to manual 'tapping' manipulation of the surround view image.

Referring to FIG. 7A, a trigger action 431 in the form of a first tap on the display 210 or alternative interface tool is detected, whereupon the control system 200 responds to the detected trigger action 431 by manipulating the first (e.g., overhead) image on the display 210 to a second image on the display 210 in an outward-facing perspective view 244a (step 442) corresponding to, e.g., the selected zone.

Figure 7B:
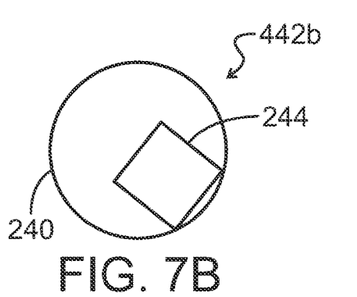

Referring to FIG. 7B, a different trigger action 431 in the form of a second tap on the display 210 or alternative interface tool is detected, whereupon the control system 200 responds to the detected trigger action 431 by manipulating the first (e.g., overhead) image on the display 210 to a different second image on the display 210 in an outward-facing perspective view 244b corresponding to, e.g., the selected zone.

In addition, or in further alternative embodiments, a trigger action detected in step 430 may be a detected "slide" action 431 with respect to the display 210 or equivalent interface tool, while currently in an outward-facing sub-view 244, wherein the current outward-facing sub-view is pivoted to the left or to the right about the circumference of the overhead bowl view 240 based on the respective left or right direction of the slide trigger 431.

Figure 8A:
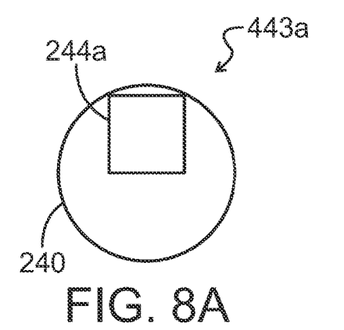
FIGS. 8A-8C are graphical diagrams representing lateral viewing zones corresponding to manual 'sliding' manipulation of the surround view image.
Figure 8B:
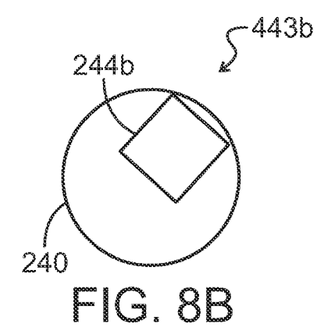
Figure 8C:
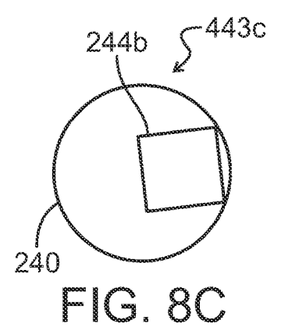

Referring to FIGS. 8A-8C, a trigger action 431 in the form of a sliding gesture to the right is detected via the display 210, whereupon the control system 200 responds to the detected trigger action 431 by manipulating the current (as of the moment before the trigger action) outward-facing image 244a on the display 210 to a modified outward-facing image 244b on the display 210 (step 443) based on a corresponding shift of the respective zones to the right (i.e., clockwise) about a central axis and along the circumference of the bowl view 240. A subsequent trigger action 431 in the form of another sliding gesture to the right may further be detected via the display 210, whereupon the control system 200 responds to the subsequent detected trigger action 431 by manipulating the outward-facing image 244b on the display 210 to outward-facing image 244c on the display 210. It may be understood that in accordance with this described embodiment, a trigger action 431 in the form of a sliding gesture to the left may result in manipulation of the outward-facing image 244a on the display 210 to a modified outward-facing image 244b on the display 210 based on a corresponding shift of the respective zones to the left (i.e., counter-clockwise) about a central axis and along the circumference of the bowl view 240. However, these directions are intended as illustrative, and it is theoretically possibly that alternative sliding gestures can be programmatically interpreted in alternative manners by the control system 200 to produce a corresponding manipulation of the displayed images.

Alternatively, the control system 200 may manipulate the initial outward-facing image 244a to the outward-facing image 244c with only one sliding trigger action that for example extends further to the right than the sliding trigger action that produced the outward-facing image 244b. Still further, the control system 200 may manipulate the initial outward-facing image 244a to a modified outward-facing image 244b, 244c, . . . 244x in an orientation that is dependent for example on the direction of the sliding gesture, the length of the sliding gesture, the velocity of the sliding gesture, or the like, as may further collectively be described as detected characteristics of the sliding gesture.

In the previous discussion with respect to FIGS. 5-8C, each of the detected trigger actions 431 corresponded to manual gestures with respect to the display 210 or equivalent interface tool. However, each of the display manipulations of step 440 (and sub-steps 441-443) may further be implemented automatically using a variety of alternative triggers, examples of which are now provided in non-limiting fashion.

In various embodiments, a surround view image 242 may be manipulated 440 automatically based on a trigger 432 associated with a detected change in configuration for the self-propelled work vehicle 100, such as identifying that a specific type of working implement 120 is equipped. In the context of for example a forks attachment 120 being equipped to a loader, the surround view image 242 may be manipulated automatically to an appropriate sub-view 244 with a simulated field of view and distortion determined so as to give the best view of the tips of the forks to the operator. As another example, when a cold planer 120 is detected as being mounted on a skid steer loader (SSL), the surround view image 242 may be manipulated automatically to a sub-view 244 of the rear side of the self-propelled work vehicle 100, in expectation that the work vehicle 100 will be traveling in reverse.

A surround view image 242 in certain embodiments may be manipulated 440 automatically based on a trigger 433 associated with detection of certain operating conditions or a predetermined work state. In other words, when the control system 200 determines that the self-propelled work vehicle 100 is performing a certain function, the surround view image 242 can automatically change to a smaller sub-view 244 which gives more focused visibility appropriate to that function. For example, if the work vehicle 200 is determined to be backing up straight (or such movement is predicted based on detected steering commands or based on a detected work state consistent with such movement), the surround view image 242 changes to a sub-view 244 of the rear of the work vehicle 100. As another example, on an excavator the boom and bucket controls may be engaged in a digging or trenching pattern, wherein the control system 200 detects the relevant work state and changes the surround view image 242 to a sub-view 244 of the front of the work vehicle 100, which focuses on the boom and bucket 120. On the same excavator, when the work vehicle 100 is commanded to swing, the control system 200 may likewise detect the change in work state and change the surround view image 242 to a sub-view 244 showing the area into which the counterweight is swinging.

In addition to changing a surround view image 242 to a sub-view 244 based on a determined region of particular interest, the distortion and simulated field of view of the surround view image 242 can also be manipulated based on a detected function or operating condition. For example, upon detecting that the work vehicle 100 is traveling faster, the control system 200 may manipulate the simulated field of view to become larger.

A surround view image 242 in certain embodiments may be manipulated 440 automatically based on a trigger 434 associated with detected or predicted movements of a working implement 120. For example, the simulated field of view may become automatically adjusted to increase the field of view upon detecting that a working implement 120 such as an excavator boom reaches out farther. A surround view image 242 can also be manipulated automatically by the control system 200 in accordance with a detected work state or cycle. For example, if it is detected that an excavator 100 is operating in a twelve-second cycle of 180-degree truck loading, then the control system 200 may anticipate when the operator is about to swing the main frame 132 of the work vehicle 100 and preemptively bring up a sub-view 244 of the area into which the operator will swing.

A surround view image 242 in certain embodiments may be manipulated 440, such as to change the region of interest, automatically based on a trigger 435 associated with obstacle detection. If an obstacle is detected by the obstacle detection system 206, alone or in coordination with the controller 112, the surround view image 242 may be automatically changed to a sub-view 244 which focuses on the area where the object was detected. If the obstacle detection system 206 outputs a height of the object, the controller 112 may be configured to automatically manipulate the distortion and simulated field of view of the image 242, 244 to give the detected object a less distorted appearance in the image 242, 244.

In various embodiments, the control system 200 can also lock the sub-view 244 to a recognized object of interest, such as for example a truck or trench. The object of interest may for example be defined in accordance with a detected known obstacle or target, an estimated work state, a type of working implement, operator selections/commands, or the like.

In various embodiments, the user interface 116 may be configured to enable selective application of the manual triggers 431 and/or one or more automatic triggers 432-435 as disclosed herein. An operator may for example be able to select an automatic mode wherein any of the aforementioned automatic triggers are allowed to cause manipulation of the displayed image(s), but further to override the automatically generated display and cause the display to revert to a standard overhead image or any other selectable image option. The operator may for example otherwise be able to selectively distinguish between a number of available automatic trigger options, wherein for example the operator can specify that the automatic manipulation of the displayed image(s) is appropriate for certain of the automatic triggers 432-435 but will be ignored for the other (e.g. non-specified) triggers.

The control system 200 may further enable supplementation of the automatically generated display image(s) based on detected manual gestures 431, rather than simply overriding the automatic results. For example, the radius and/or depth of the bowl 240 may be automatically modified in accordance with a change in speed, wherein the overhead image 242 is accordingly modified as well, and the operator may make a manual gesture which produces a further modified radius and/or depth of the bowl 240 rather than causing the image to revert to the initial image, which may otherwise be implemented using a separate manual selection.

The control system 200 in various embodiments may be configured to prioritize among detected or predicted trigger actions to determine which display image(s) to present or manipulate, or an order in which a plurality of display images are shown. For example, a first display portion may typically include a rendered display image that moves or alternates between positions corresponding to an excavator work state (e.g., dig, swing to dump, dump, swing to dig), but the first display portion may instead switch to a display image corresponding to a detected obstacle or other safety issue that arises during the excavator operation, or alternatively a second display portion may be generated and optionally highlighted to call attention to the newly detected obstacle.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of displaying surroundings of a self-propelled work vehicle comprising a main frame, the method comprising:
   receiving one or more images corresponding to surroundings of the work vehicle, said images recorded via a corresponding one or more cameras supported by the main frame;
   processing the recorded images to map the images to a shape corresponding to a first defined display radius and a first defined display depth, wherein a first display image is generated on a display unit based on the recorded images and comprises one or more of an overhead downward facing display image and an outward facing display image;
   responsive to at least a first type of trigger action, automatically generating a second display image as a smaller sub-view of the first display image on the display unit, the second display image corresponding to a selected region of interest in the surroundings of the work vehicle; and responsive to at least a second type of trigger action, automatically reconfiguring a display radius and a display depth of the currently displayed first display image or second display image based on identified parameters of the trigger action.

2. The method of claim 1, wherein the trigger action of at least the first type comprises one or more automatically determined operating conditions.

3. The method of claim 2, wherein:
the trigger action of at least the second type comprises a detected change in speed of the self-propelled work vehicle,
the overhead display image is reconfigured to increase the second defined display radius and the second defined display depth in association with an increase in the speed of the self-propelled work vehicle, and
the overhead display image is reconfigured to decrease the second defined display radius and the second defined display depth in association with a decrease in the speed of the self-propelled work vehicle.

4. The method of claim 1, wherein the at least second type of trigger action comprises a selective manual engagement of the overhead display image via a user interface.

5. The method of claim 1, wherein the trigger action of at least the first type comprises a detected change in configuration of the self-propelled work vehicle.

6. The method of claim 5, wherein the self-propelled work vehicle comprises a work implement coupled to the main frame, and wherein the detected change in configuration of the self-propelled work vehicle comprises a detected change in configuration of the work implement.

7. The method of claim 1, wherein the self-propelled work vehicle comprises a work implement controllably moveable with respect to the main frame, and wherein the trigger action of at least the first type comprises one or more of: a detected movement of the work implement; and a predicted movement of the work implement.

8. The method of claim 7, wherein the movement of the work implement is predicted based on a determined work cycle of the self-propelled work vehicle.

9. The method of claim 1, wherein the trigger action of at least the second type comprises a detected obstacle in the surroundings of the work vehicle.

10. The method of claim 1, further responsive to a trigger action of at least a third type to laterally pivot the outward-facing display image.

11. The method of claim 1, wherein the outward-facing display image is generated in place of an overhead display image responsive to the trigger action of at least the second type.

12. The method of claim 1, wherein an outward-facing display image and an overhead display image are independently displayed on the same display unit, and independently modified responsive to different types of trigger actions.

13. A self-propelled work vehicle comprising:
a main frame;
one or more cameras supported by the main frame and configured to record images of corresponding surroundings of the work vehicle;
at least one work implement coupled to the main frame and configured for working terrain surrounding the work vehicle; and
a controller communicatively linked to the one or more cameras, and configured to
process the recorded images to map the images to a shape corresponding to a first defined display radius and a first defined display depth, wherein a first display image is generated on a display unit based on the recorded images and comprises one or more of an overhead downward facing display image and an outward facing display image;
responsive to at least a first type of trigger action, to automatically generate a second display image as a smaller sub-view of the first display image on the display unit, the second display image corresponding to a selected region of interest in the surroundings of the work vehicle; and
responsive to at least a second type of trigger action, to automatically reconfigure a display radius and a display depth of the currently displayed first display image or second display image based on identified parameters of the trigger action.

14. The self-propelled work vehicle of claim 13, wherein:
the display unit and an associated user interface are located on the self-propelled work vehicle.

15. The self-propelled work vehicle of claim 13, wherein the trigger action of at least the second type comprises one or more of:
a detected change in speed of the self-propelled work vehicle, wherein the overhead display image is reconfigured to increase the defined display radius and the defined display depth in association with an increase in the speed of the self-propelled work vehicle, and the overhead display image is reconfigured to decrease the defined display radius and the defined display depth in association with a decrease in the speed of the self-propelled work vehicle; and
a selective manual engagement of the overhead display image via a user interface.

16. The self-propelled work vehicle of claim 13, wherein:
the generated display image comprises an outward facing display image;
the controller is configured, responsive to a trigger action of the at least first type to manipulate the selected region of interest for the generated outward facing display image.

17. The self-propelled work vehicle of claim 13, wherein the at least first type of trigger action comprises a detected change in configuration of the self-propelled work vehicle.

18. The self-propelled work vehicle of claim 13, wherein the at least first type of trigger action comprises one or more of: a detected movement of the work implement; and a predicted movement of the work implement.

19. The self-propelled work vehicle of claim 18, wherein the movement of the work implement is predicted based on a determined work cycle of the self-propelled work vehicle.

20. The self-propelled work vehicle of claim 13, wherein the controller is configured, further responsive to a trigger action of at least a third type, to laterally pivot the outward-facing display image.

* * * * *